United States Patent [19]
Campbell

[11] Patent Number: 5,377,581
[45] Date of Patent: Jan. 3, 1995

[54] ELECTRICAL COFFEE POT POSITIONABLE IN A VEHICLE AND OPERABLE FROM A CIGARETTE LIGHTER RECEPTACLE

[76] Inventor: Jerry D. Campbell, 2281 S. Stagecoach La., Fallbrook, Calif. 92028

[21] Appl. No.: 215,102

[22] Filed: Mar. 21, 1994

[51] Int. Cl.$^6$ ............................................. A47J 31/00
[52] U.S. Cl. ...................................... 99/295; 99/290; 99/307; 219/202
[58] Field of Search ................. 99/279, 295, 280, 281, 99/282, 283, 290, 299, 300, 304, 306, 307; 219/202

[56] References Cited

U.S. PATENT DOCUMENTS

| | | | |
|---|---|---|---|
| 3,915,079 | 10/1975 | Balderson | 219/202 |
| 3,955,713 | 5/1976 | Hurley | 219/202 |
| 4,382,402 | 5/1983 | Alvarez | 99/295 |
| 4,674,400 | 6/1987 | Rondel | 99/279 |
| 4,714,011 | 12/1987 | Ly | 99/279 |
| 5,123,335 | 6/1992 | Abelu | 99/295 |

*Primary Examiner*—Robert W. Jenkins

[57] ABSTRACT

An electrical coffee pot positionable in a vehicle and operable from a cigarette lighter receptacle comprising a base plate constituting a lower component positionable in a vehicle in a horizontal disposition with an electrical switch movable between an on and off orientation and an electrical resistance wire operable in response to the orientation of the switch, the base also including a tube for the passage of water for use in brewing coffee with the electrical resistance wire spirally wound therearound to heat water passing therethrough, the electrical resistance wire coupled to an electrical cord having at one end a device positionable in the cigarette lighter receptacle of the vehicle to power the resistance wire; an upper component horizontally disposed and adapted to receive heated water from the tube in the base plate with a drawer adapted to receive the coffee to be brewed from the passage of water therethrough; a vertically disposed back component coupling the lower component and the upper component; a water tank positioned adjacent to one side of the device and coupled to the lower plate, upper plate and back plate; and the water conveying tube having a lower end within the lower extent of the tank extending through the lower component and unit through the electrical resistance wire, then upwardly through the back component and terminating at a location in the upper component over the coffee to be brewed.

3 Claims, 4 Drawing Sheets

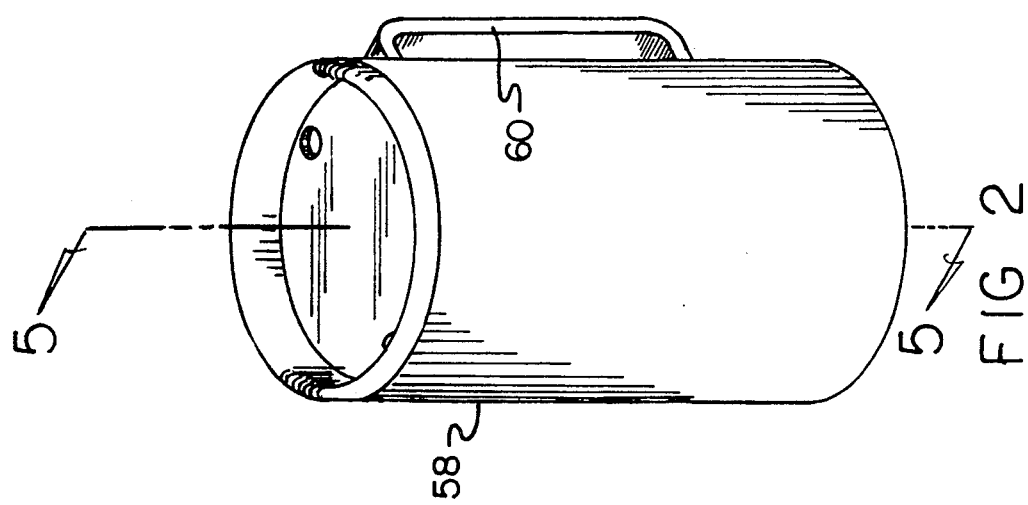
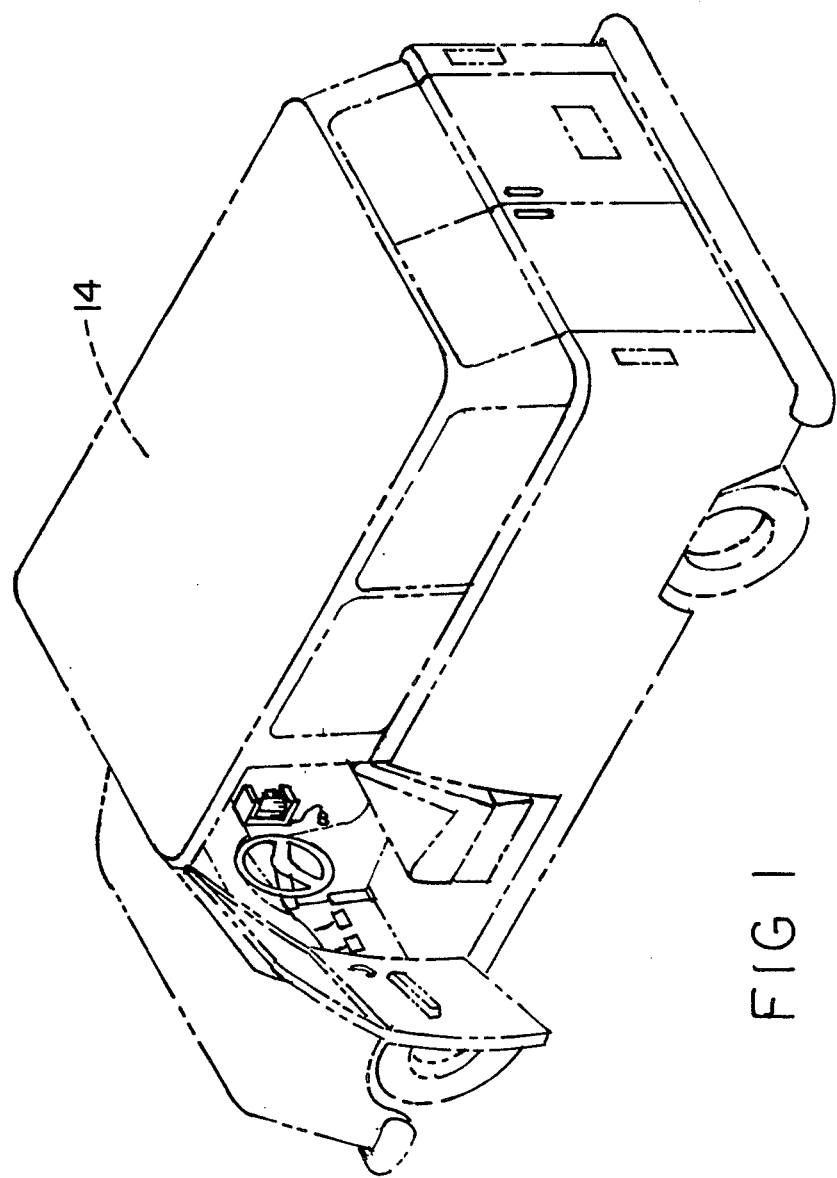

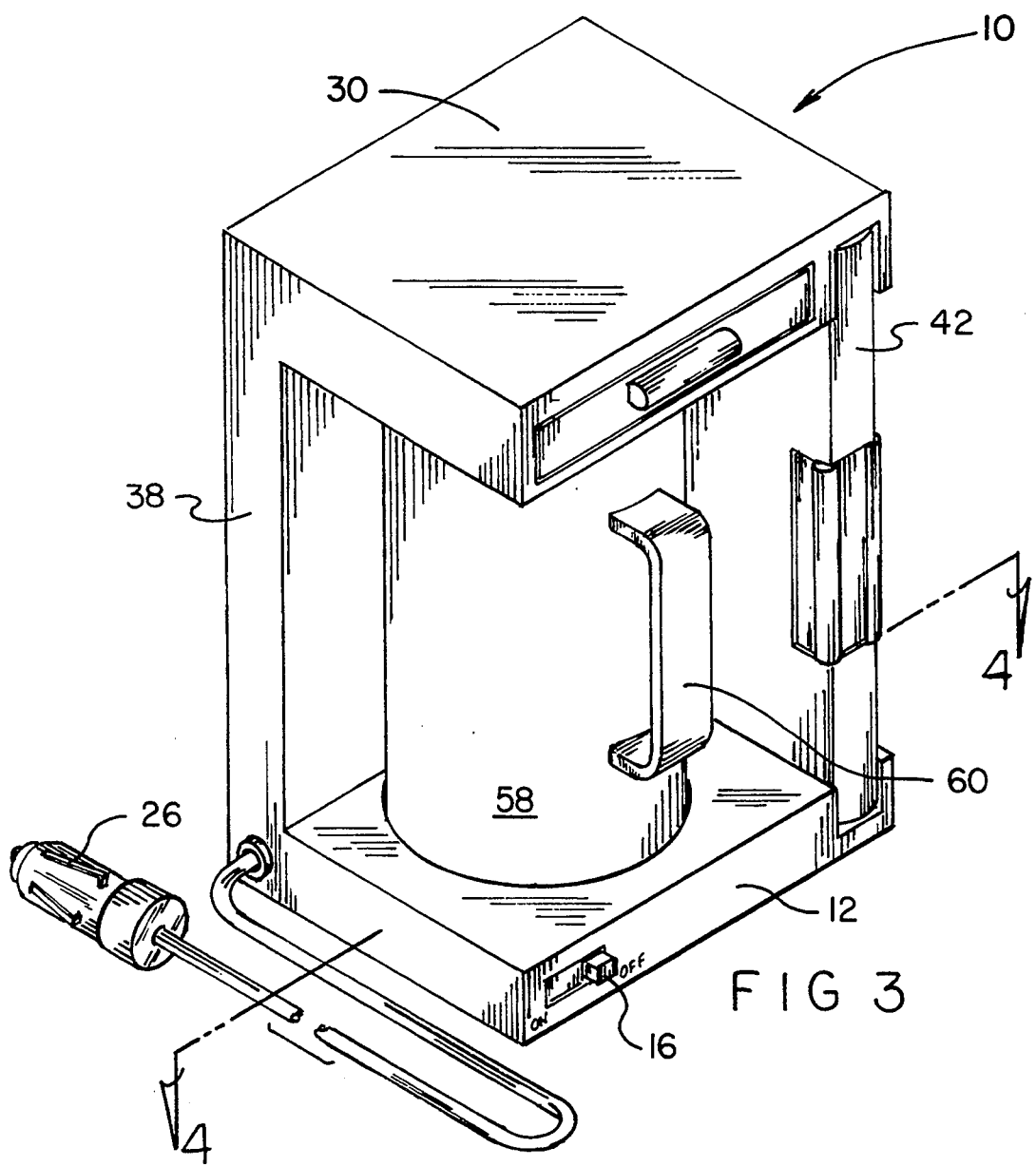
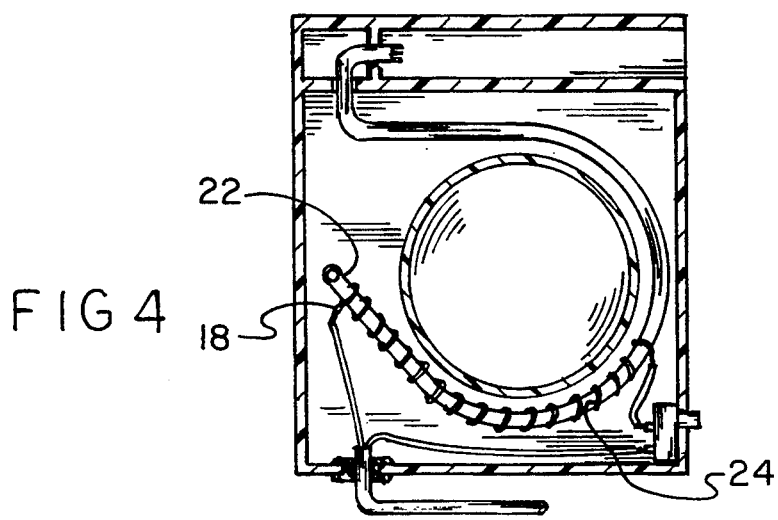

ELECTRICAL COFFEE POT POSITIONABLE IN A VEHICLE AND OPERABLE FROM A CIGARETTE LIGHTER RECEPTACLE

BACKGROUND OF THE INVENTION

1. Field of the Invention

The present invention relates to an electrical coffee pot positionable in a vehicle and operable from a cigarette lighter receptacle and more particularly pertains to brewing coffee in a car through an electrical device operable from the electrical system of the vehicle.

2. Description of the Prior Art

The use of coffee makers is known in the prior art. More specifically, coffee makers heretofore devised and utilized for the purpose of brewing coffee with an electrical device are known to consist basically of familiar, expected and obvious structural configurations, notwithstanding the myriad of designs encompassed by the crowded prior art which have been developed for the fulfillment of countless objectives and requirements.

By way of example, the prior art discloses in U.S. Pat. No. 4,382,402 a portable coffee maker.

U.S. Pat. No. 4,627,334 to Shanklin discloses a portable, nestable beverage brewing system.

U.S. Pat. No. 4,674,400 to Rondel et al. discloses a portable beverage brewer.

U.S. Pat. No. 4,714,011 to Ly discloses a portable beverage brewing apparatus.

U.S. Pat. No. 5,063,838 to Matuschek discloses a portable apparatus for brewing hot beverages.

In this respect, the electrical coffee pot positionable in a vehicle and operable from a cigarette lighter receptacle according to the present invention substantially departs from the conventional concepts and designs of the prior art, and in so doing provides an apparatus primarily developed for the purpose of brewing coffee in a car through an electrical device operable from the electrical system of the vehicle.

Therefore, it can be appreciated that there exists a continuing need for a new and improved electrical coffee pot positionable in a vehicle and operable from a cigarette lighter receptacle which can be used for brewing coffee in a car through an electrical device operable from the electrical system of the vehicle. In this regard, the present invention substantially fulfills this need.

SUMMARY OF THE INVENTION

In view of the foregoing disadvantages inherent in the known types of coffee makers now present in the prior art, the present invention provides an improved electrical coffee pot positionable in a vehicle and operable from a cigarette lighter receptacle. As such, the general purpose of the present invention, which will be described subsequently in greater detail, is to provide a new and improved electrical coffee pot positionable in a vehicle and operable from a cigarette lighter receptacle and method which has all the advantages of the prior art and none of the disadvantages.

To attain this, the present invention essentially comprises a new and improved electrical coffee pot positionable in a vehicle and operable from a cigarette lighter receptacle comprising, in combination, a base plate constituting a lower component positionable in a vehicle in a horizontal disposition with an electrical switch movable between an on and off orientation and an electrical resistance wire operable in response to the orientation of the switch, the base also including a tube for the passage of water for use in brewing coffee with the electrical resistance wire spirally wound therearound to heat water passing therethrough, the electrical resistance wire coupled to an electrical cord having at one end a device positionable in the cigarette lighter receptacle of the vehicle to power the resistance wire when the switch is in the on orientation; an upper component horizontally disposed and adapted to receive heated water from the tube in the base plate with a drawer adapted to receive the coffee to be brewed from the passage of water therethrough; a vertically disposed back component coupling the lower component and the upper component; a water tank positioned secured to one side of the device and coupled to the lower plate, upper plate and back component; the water conveying tube having a lower end within the lower extent of the tank extending through the lower component and unit through the electrical resistance wire, then upwardly through the back component and terminating at a location in the upper component over the coffee to be brewed; and a cup having a handle, a lower closed end positioned on the lower component and an upper open end position located beneath the drawer whereby when water is in the tank and switch turned to the on orientation, there will be a flow of water while being heated and moved to an elevated location for being gravity fed through the coffee in the drawer and then into the cup.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide new and improved electrical coffee pot positionable in a vehicle and operable from a cigarette lighter receptacle which has all the advantages of the prior art coffee makers and none of the disadvantages.

It is another object of the present invention to provide new and improved electrical coffee pot positionable in a vehicle and operable from a cigarette lighter receptacle which may be easily and efficiently manufactured and marketed.

It is a further object of the present invention to provide new and improved electrical coffee pots positionable in a vehicle and operable from a cigarette lighter receptacle which is of durable and reliable construction.

An even further object of the present invention is to provide new and improved electrical coffee pot positionable in a vehicle and operable from a cigarette lighter receptacle which are susceptible of a low cost of manufacture with regard to both materials and labor, and which accordingly is then susceptible of low prices of sale to the consuming public, thereby making such electrical coffee pot positionable in a vehicle and operable from a cigarette lighter receptacle economically available to the buying public.

Still yet another object of the present invention is to provide new and improved electrical coffee pot positionable in a vehicle and operable from a cigarette lighter receptacle which provides in the apparatuses and methods of the prior art some of the advantages thereof, while simultaneously overcoming some of the disadvantages normally associated therewith.

Still another object of the present invention is to brew coffee in a car through an electrical device operable from the electrical system of the vehicle.

Lastly, it is an object of the present invention to provide new and improved electrical coffee pot positionable in a vehicle and operable from a cigarette lighter receptacle comprising, a base plate constituting a lower component positionable in a vehicle in a horizontal disposition with an electrical switch movable between an on and off orientation and an electrical resistance wire operable in response to the orientation of the switch, the base also including a tube for the passage of water for use in brewing coffee with the electrical resistance wire spirally wound therearound to heat water passing therethrough, the electrical resistance wire coupled to an electrical cord having at one end a device positionable in the cigarette lighter receptacle of the vehicle to power the resistance wire; an upper component horizontally disposed and adapted to receive heated water from the tube in the base plate with a drawer adapted to receive the coffee to be brewed from the passage of water therethrough; a vertically disposed back component coupling the lower component and the upper component; a water tank positioned adjacent to one side of the device and coupled to the lower plate, upper plate and back plate; and the water conveying tube having a lower end within the lower extent of the tank extending through the lower component and unit through the electrical resistance wire, then upwardly through the back component and terminating at a location in the upper component over the coffee to be brewed.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a perspective illustration of the preferred embodiment of the new and improved electrical coffee pot positionable in a vehicle and operable from a cigarette lighter receptacle constructed in accordance with the principles of the present invention.

FIG. 2 is a perspective illustration of a cup adapted to be used in association with the device of FIG. 1.

FIG. 3 is an enlarged perspective view showing of the coffee maker and cup of the prior Figures.

FIG. 4 is a cross-sectional view taken along lines 4—4 of FIG. 3.

The same reference numerals refer to the same parts through the various Figures.

DESCRIPTION OF THE PREFERRED EMBODIMENT

Figure 5:
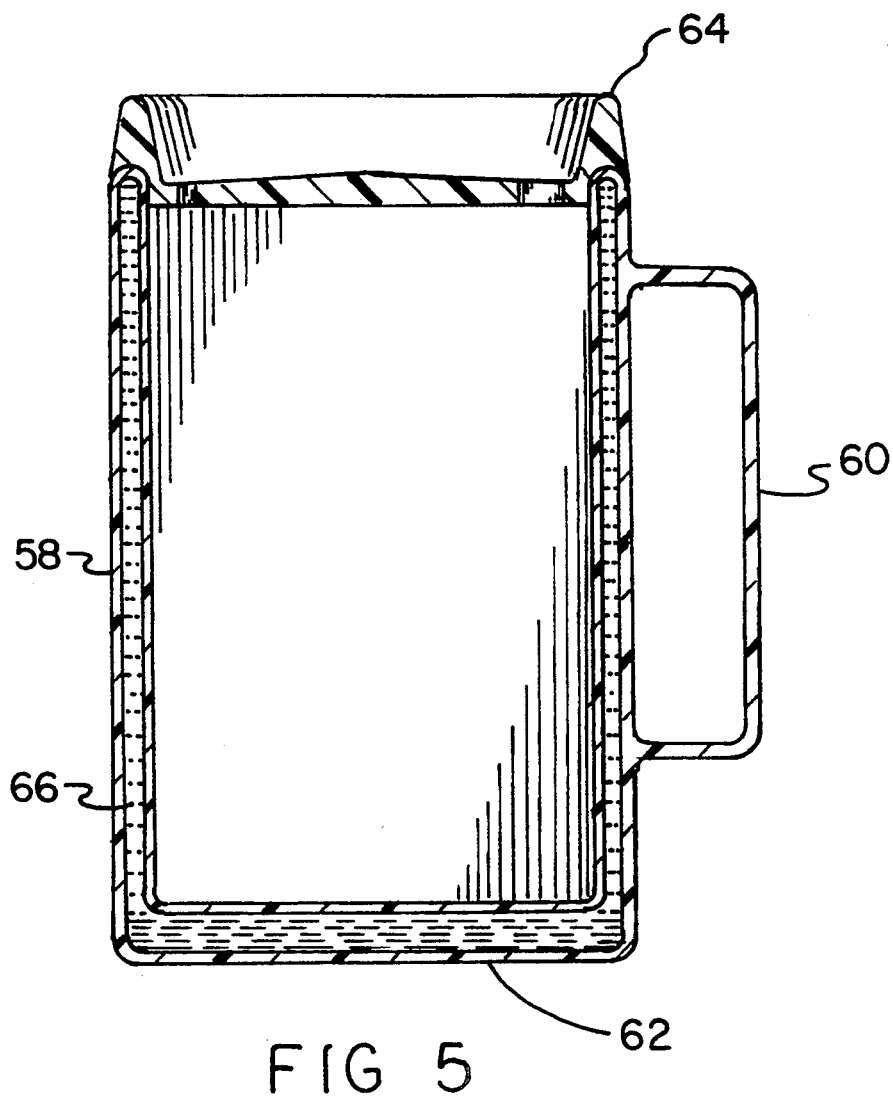
FIG. 5 is a cross-sectional view of the cup taken along lines 5—5 of FIG. 2.

With reference now to the drawings, and in particular to FIG. 1 thereof, the preferred embodiment of the new and improved electrical coffee pot positionable in a vehicle and operable from a cigarette lighter receptacle embodying the principles and concepts of the present invention and generally designated by the reference numeral 10 will be described.

Specifically, the present invention, the new and improved electrical coffee pot positionable in a vehicle and operable from a cigarette light receptacle, is a system 10 comprised with a plurality of components. The components are individually configured and correlated with respect to each other to attain the desired objective. In their broadest context, such components include a base plate constituting a lower component, an upper component, a back, a water tank and a cup.

More specifically, the base plate 12 is formed to constitute the lower component of the system. Such lower component is positionable in a vehicle 14 in horizontal disposition. Note FIGS. 1 and 3. The lower component includes an electrical switch 16 movable, in the conventional manner, between an on and off orientation. Also included is an electrical resistance wire 18. The wire is operable in response to the orientation of the switch.

The lower component also includes a tube 22. The tube is for the passage of water for use in brewing coffee. Water passing through the tube is heated through an electrical resistance wire 24 spirally wound around the tube. Passage of water through the tube while the heated water is energized and creating heat. The electrical resistance wire has an elongated device 26 which is positionable in the cigarette lighter receptacle of the vehicle in which the device is to be utilized. The switch is also in such electrical line and has a toggle exposed for under the control of the user. When the switch is in the on orientation and the device is positionable in the receptacle or cigarette lighter, power will be provided to the wire spiral wound around the tube for heating water passing therethrough.

The next component of the system is an upper component 30 horizontally disposed. Such upper component is adapted to receive heated water from the tube in the base plate 12. Also provided in the upper component is a drawer 34 adapted to receive the ground coffee to be brewed. The coffee to be drunk is created through the passage of the water from the tube whereat it is heated and then gravity fed through the coffee in the drawer to a cup therebelow as will be later described.

One additional component of the device is a vertically disposed back component 38. Such back component is secured at its lower end to one edge of the lower component. At its upper end it is coupled to the upper component. The tube of water to be heated is passed through the tube in the normal course of brewing coffee.

Next provided is a water tank 42. The water tank is secured to one side of the device. One edge, the lower edge 44 is secured to an adjacent edge of the lower component. The upper edge 46 is secured to an adjacent edge of the upper component and the rear edge 48 is secured to one edge of the back component. This leaves the forward edge of the water tank free. Therein is provided a transparent section 49 to determine the level of water within the tank. An aperture 47 is selectively closable through a reciprocable plug 45, urged closed by a spring 43. Positioning the water tank 42 in position causes tube 41 to open the plug to allow water to be fed therefrom.

Figure 6:
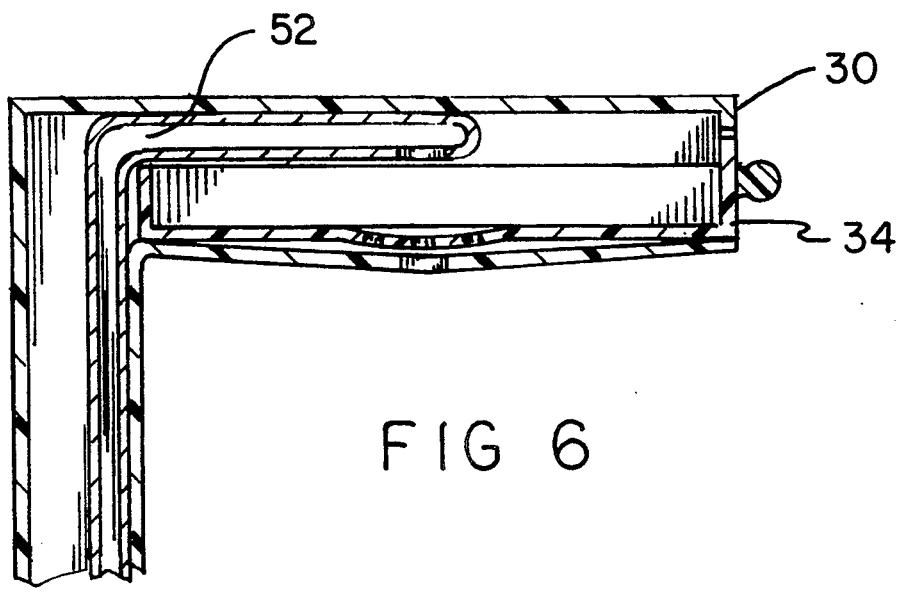
FIG. 6 is a cross-sectional view taken vertically through the center of the device and showing its upper extent.
Figure 7:
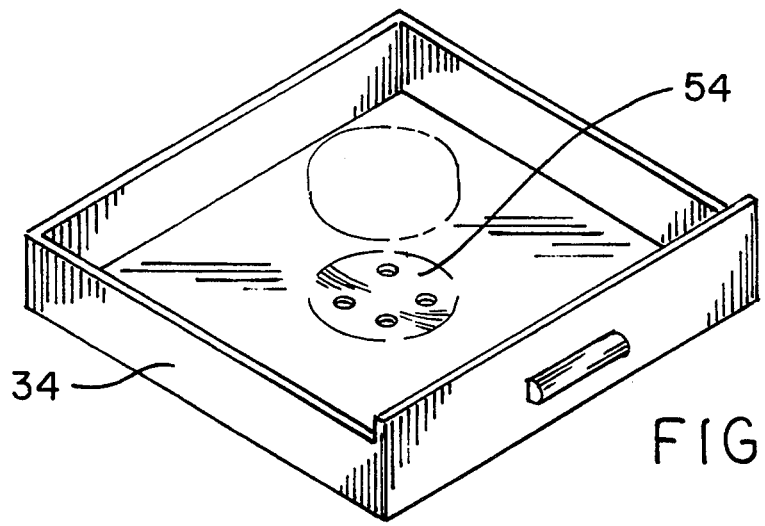
FIG. 7 is a perspective illustration of the drawer as shown in FIGS. 1, 3 and 6.
Figure 8:
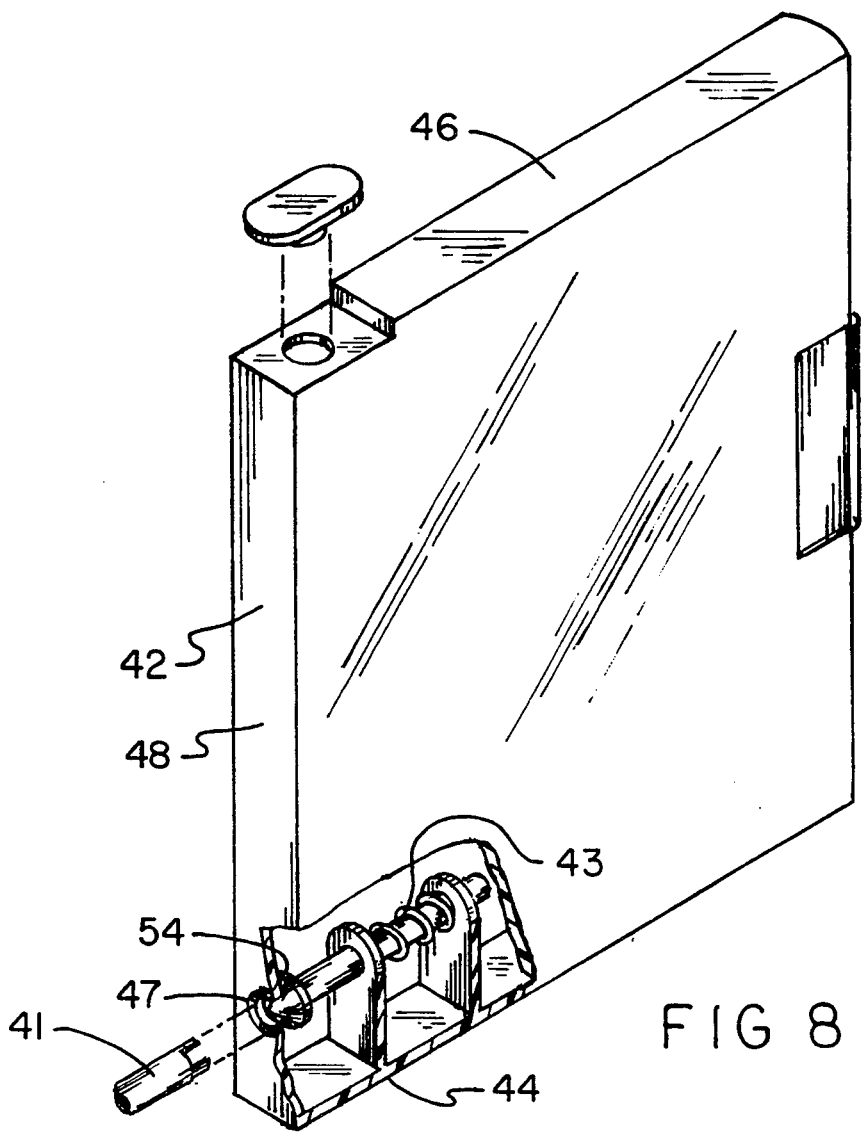
FIG. 8 is a perspective illustration with parts broken away to show certain internal constructions of the water reservoir of the device shown in the prior Figures.

The water conveying tube 52 can best be seen in FIGS. 4, 6 and 8. Such tube has its lower end within the lower extent of the tank. It extends through the lower component and through the electrical resistance wires at such location. The tube then extends upwardly through the back component and terminates at a location in the upper component centrally positioned over the basket 54 for coffee therein to be brewed.

The last component of the device is a cup 58. The cup is preferably of a conventional design with a handle 60. It also has a lower closed end 62 positionable on the lower component during the brewing operation. Note FIG. 3. The cup also has an upper open end 64. Such upper open end is located beneath the drawer. In this manner, when water is in the tank and the switch is turned to the on orientation, there will be a flow of water. Such flow occurs during the heating thereof. The heated water is then moved to an elevated location above the basket and coffee for being gravity fed through the coffee in the drawer and then into the cup therebelow. The cup is preferably formed of a two wall construction with a thermally insulating material 66 between the walls at the sides and bottom of the cup.

The present invention is a new design in automotive and travel beverage makers. It is designed to be easily operated by the driver of a vehicle. However, this will not restrict the location of the product because it can be mounted just about anywhere in an R.V., big rig truck or automobile. This new method of brewing beverages, while on the go will be virtually spill-free and require very little concentration or effort from the operator.

The coffee pot would actually be a specially designed, insulated, travel cup. The non-spill lid would be specially designed to allow the hot water to flow into the cup and allow air to escape preventing in any spillage. It will have the capacity to hold 16 oz. of liquid. It will be designed to fit snug into the housing of the beverage maker to prevent spilling or falling on rough roads. The cup can be sold with the initial basic machine, or separately as an optional part.

The water cartridge of the present invention makes the brewer the ideal travel mate. This device consists of a hard plastic outer shell configured in such a way that it fits into the brewer the same way that the old 8 track tape fits in its player. Inside the cartridge is a thick plastic bag that is designed to hold either 12 or 16 oz of water. Each cartridge is marked for the capacity, but the outer shell remains the same size. The cartridge is designed to be refilled by the user for maximum economy. The refill plug would be large enough in diameter to easily allow water to flow into the bag. Because the bag must collapse to allow gravity to push the water into the heating element, the refill plug must be either located near the female coupling or a vent hole must be put in the plug to allow air to collapse the bag. The dispensing end will have a male coupler that is activated only when it is placed into the female coupling. The water cartridge should be manufactured in such a way so that the average user can replace the bag inside.

The heating element of the present invention is designed to operate on 12 volt auto power but should also be adaptable to standard 110 volt household current. The operator would have the option of either "hard wiring" the power cord directly to a hot wire or using the standard cigarette lighter socket. The inlet valve would be the type of valve that lets the cold water flow in but not out. The exit valve would be the type that opens up the hot water pressure. The water reaches an acceptable brewing temperature of approximately 180 degrees prior to being forced into the filter compartment.

The beverage drawer of the present invention would only need to be approximately ¾ inch to 1½ inches deep to allow the hot water to flow through. The drawer should be designed to clip into the system allowing it to stay closed under rough driving conditions. The bottom would be angled in such a way that the beverage being brewed would flow into the large hole in the top of the cup.

Just about any beverage that is normally consumed hot could be used with this brewer. Coffee and tea could be prepackaged in single serving filters that only need to be placed in the beverage drawer for brewing.

Because the water is in a self-contained cartridge, three configurations of this system can be produced and experimented with until the most economical and efficient product is developed.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A new and improved electrical coffee pot positionable in a vehicle and operable from a cigarette lighter receptacle comprising, in combination:

a base plate constituting a lower component positionable in a vehicle in a horizontal disposition with an electrical switch movable between an on and off orientation and an electrical resistance wire operable in response to the orientation of the switch, the base also including a tube for the passage of water for use in brewing coffee with the electrical resistance wire spirally wound therearound to heat water passing therethrough, the electrical resistance wire coupled to an electrical cord having at one end a device positionable in the cigarette lighter receptacle of the vehicle to power the resistance wire when the switch is in the on orientation;

an upper component horizontally disposed and adapted to receive heated water from the tube in the base plate with a drawer adapted to receive the coffee to be brewed from the passage of water therethrough;

a vertically disposed back component coupling the lower component and the upper component;

a water tank positioned secured to one side of the device and coupled to the lower plate, upper plate and back component;

the water conveying tube having a lower end within the lower extent of the tank extending through the lower component and unit through the electrical resistance wire, then upwardly through the back component and terminating at a location in the upper component over the coffee to be brewed; and a cup having a handle, a lower closed end positioned on the lower component and an upper open end position located beneath the drawer whereby when water is in the tank and switch turned to the on orientation, there will be a flow of water while being heated and moved to an elevated location for being gravity fed through the coffee in the drawer and then into the cup.

2. An electrical coffee pot positionable in a vehicle and operable from a cigarette lighter receptacle comprising:

a base plate constituting a lower component positionable in a vehicle in a horizontal disposition with an electrical switch movable between an on and off orientation and an electrical resistance wire operable in response to the orientation of the switch, the base also including a tube for the passage of water for use in brewing coffee with the electrical resistance wire spirally would therearound to heat water passing therethrough, the electrical resistance wire coupled to an electrical cord having at one end a device positionable in the cigarette lighter receptacle of the vehicle to power the resistance wire;

an upper component horizontally disposed and adapted to receive heated water from the tube in the base plate with a drawer adapted to receive the coffee to be brewed from the passage of water therethrough;

a vertically disposed back component coupling the lower component and the upper component;

a water tank positioned adjacent to one side of the device and coupled to the lower plate, upper plate and back plate; and the water conveying tube having a lower end within the lower extent of the tank extending through the lower component and unit through the electrical resistance wire, then upwardly through the back component and terminating at a location in the upper component over the coffee to be brewed.

3. The device as set forth in claim 2 and further including:

a cup having a handle, a lower closed end positioned on the lower component and an upper end position located beneath the drawer whereby when water is in the tank and switch turned to the on orientation, there will be a flow of water while being heated and moved to an elevated location for being gravity fed through the coffee in the drawer and then into the cup.

* * * * *